(12) United States Patent
Takikita et al.

(10) Patent No.: US 9,242,569 B2
(45) Date of Patent: Jan. 26, 2016

(54) VEHICLE CHARGE SYSTEM AND VEHICLE CHARGE METHOD

(75) Inventors: Mamoru Takikita, Chiyoda-ku (JP); Mao Kawamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 129 days.

(21) Appl. No.: 14/004,324

(22) PCT Filed: Oct. 5, 2011

(86) PCT No.: PCT/JP2011/072940

§ 371 (c)(1),
(2), (4) Date: Sep. 10, 2013

(87) PCT Pub. No.: WO2013/011596

PCT Pub. Date: Jan. 24, 2013

(65) Prior Publication Data

US 2013/0342166 A1 Dec. 26, 2013

(30) Foreign Application Priority Data

Jul. 15, 2011 (JP) .................................. 2011-156429

(51) Int. Cl.
*H02J 7/00* (2006.01)
*B60L 11/18* (2006.01)
*B60L 1/00* (2006.01)

(52) U.S. Cl.
CPC ............. *B60L 11/1812* (2013.01); *B60L 1/003* (2013.01); *B60L 11/1816* (2013.01); *B60L 11/1868* (2013.01); *Y02T 10/7005* (2013.01); *Y02T 10/7066* (2013.01); *Y02T 90/14* (2013.01)

(58) Field of Classification Search
CPC ................................................... Y02T 10/7005
USPC ........................................................... 320/104
See application file for complete search history.

(56) References Cited

U.S. PATENT DOCUMENTS

2004/0232881 A1* 11/2004 Amano et al. ................ 320/104
2007/0040449 A1   2/2007 Spurlin et al.
2007/0060869 A1   3/2007 Tolle et al.
(Continued)

FOREIGN PATENT DOCUMENTS

JP   2008-149897 A    7/2008
JP   2008-247081 A   10/2008
(Continued)

OTHER PUBLICATIONS

International Search Report of PCT/JP2011/072940 dated Dec. 27, 2011.
(Continued)

*Primary Examiner* — Suresh Memula
(74) *Attorney, Agent, or Firm* — Sughrue Mion, PLLC; Richard C. Turner

(57) ABSTRACT

A vehicle charge system has a connection cable to supply power from an outside power supply, such as a commercial power supply, a driving battery, an auxiliary battery, a driving battery charge apparatus, and an auxiliary battery charge apparatus. When a voltage across the auxiliary battery is below a predetermined constant value, power from the outside power supply is supplied to a control circuit of the auxiliary battery charge apparatus, so that the auxiliary battery charge apparatus charges the auxiliary battery on its own without being controlled by a charge control portion.

5 Claims, 1 Drawing Sheet

(56) References Cited

U.S. PATENT DOCUMENTS

| | | |
|---|---|---|
| 2007/0060870 A1 | 3/2007 | Tolle et al. |
| 2007/0093786 A1 | 4/2007 | Goldsmith et al. |
| 2007/0210743 A1* | 9/2007 | Tabei et al. .................. 320/104 |
| 2009/0227855 A1 | 9/2009 | Hill et al. |
| 2010/0201196 A1 | 8/2010 | Spurlin et al. |
| 2012/0010562 A1 | 1/2012 | Hill et al. |
| 2012/0091813 A1 | 4/2012 | Spurlin et al. |
| 2012/0235626 A1* | 9/2012 | Oh et al. ....................... 320/103 |
| 2013/0119932 A1* | 5/2013 | Moon et al. ................... 320/109 |
| 2013/0127400 A1* | 5/2013 | Oh et al. ....................... 320/104 |

FOREIGN PATENT DOCUMENTS

| | | | |
|---|---|---|---|
| JP | 2009-201282 A | 9/2009 |
| JP | 2009-540783 A | 11/2009 |
| JP | 2011-062018 A | 3/2011 |
| JP | 2011-072069 A | 4/2011 |
| JP | 2011-120388 A | 6/2011 |

OTHER PUBLICATIONS

Japanese Office Action of Japanese Patent Application No. 2011-156429 dated Oct. 26, 2012.

Japanese Office Action of Japanese Patent Application No. 2011-156429 dated Jun. 26, 2012.

Communication dated May 6, 2015 from the State Intellectual Property Office of the People's Republic of China in counterpart application No. 201180071208.7.

* cited by examiner

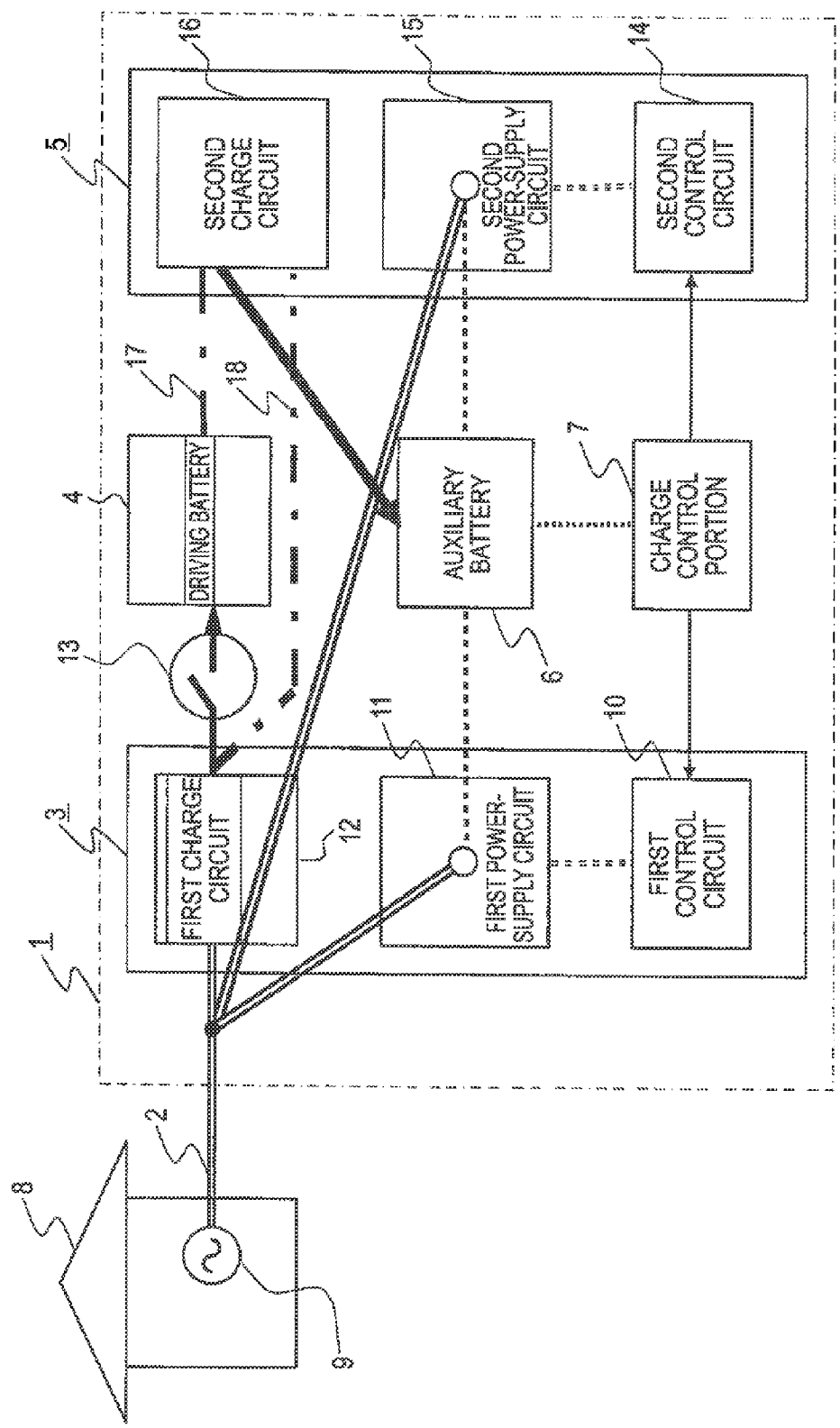

VEHICLE CHARGE SYSTEM AND VEHICLE CHARGE METHOD

CROSS REFERENCE OF RELATED APPLICATIONS

This is a National Stage of International Application No. PCT/JP2011/072940 filed Oct. 5, 2011, claiming priority based on Japanese Patent Application No. 2011-156429 filed Jul. 15, 2011, the contents of all of which are incorporated herein by reference in their entirety.

TECHNICAL FIELD

The present invention relates to a vehicle charge system and a vehicle charge method, and more particularly, to a vehicle charge system and a vehicle charge method of charging a vehicle installed with a driving battery chargeable from the outside the vehicle.

BACKGROUND ART

An electric vehicle and a hybrid vehicle are being developed in recent years as an environmentally-friendly vehicle. Such a vehicle includes an auxiliary battery that; operates a control circuit as with a vehicle in the related art, and additionally includes a driving battery that operates a running motor with its power. It is therefore necessary to charge the driving battery addition to the auxiliary battery.

When the auxiliary battery is charged, an auxiliary battery charge apparatus is controlled by the control circuit and power is supplied to the control circuit from the driving battery. When the driving battery is charged, a driving battery charge apparatus is controlled by the control circuit and power is supplied to the control circuit from the auxiliary battery. Also, the driving battery is formed of a lithium-ion battery or the like and charged by the driving battery charge apparatus under the control of a charge control portion in the vehicle according to information on respective cells making up the driving battery.

For example, JP-A-2008-149897 (PTL 1) discloses a vehicle charge system that charges the auxiliary battery by supplying power to a control power-supply circuit using power from the auxiliary battery and power from the driving battery.

CITATION LIST

Patent Literature

PTL 1: JP-A-2008-149897

SUMMARY OF INVENTION

Technical Problem

However, with the vehicle charge system disclosed in PTL 1, in a case where power cannot be supplied from the auxiliary battery and power cannot be supplied from the driving battery, either, a supply of power to the control power-supply circuits of the auxiliary battery charge apparatus and the driving battery charge apparatus is stopped. Hence, the auxiliary battery charge apparatus and the driving battery charge apparatus become inoperable. As a result, neither the auxiliary battery nor the driving battery can be charged. In other words, there is a problem that the vehicle cannot be operated until at least the auxiliary battery is charged using an outside charge apparatus.

The invention was devised to solve the problem above and has an object to provide a vehicle charge system and a vehicle charge method by which even in a case where power cannot be supplied from in-vehicle batteries, a charge control circuit using an auxiliary battery as a power supply source is operated by enabling charging to the auxiliary battery first, and then charging to a driving battery is enabled by a driving battery charge apparatus when a voltage across the auxiliary battery reaches or exceeds a predetermined voltage.

Solution to Problem

A vehicle charge system of the invention includes: a driving battery that feeds power to a running motor of a vehicle; an auxiliary battery that feeds power to an auxiliary machine of the vehicle; a charge control portion that controls charging of each of the driving battery and the auxiliary battery; a driving battery charge apparatus that is controlled by the charge control portion and charges the driving battery; and an auxiliary battery charge apparatus that is controlled by the charge control portion and charges the auxiliary battery. The driving battery charge apparatus is formed of: a first control circuit; a first power-supply circuit that supplies power to the first control circuit; and a first charge circuit that is capable of charging the driving battery. The first power-supply circuit has means for supplying power at least from an outside power supply to the first control circuit. The auxiliary battery charge apparatus is formed of: a second control circuit; a second power-supply circuit that supplies power to the second control circuit; and a second charge circuit that is capable of charging the auxiliary battery. The second power-supply circuit has means for supplying power at least from the outside power supply to the second control circuit.

Advantageous Effects of Invention

The vehicle charge system of the invention is configured as above and is capable of charging the driving battery by supplying power to the charge control portion even when power cannot be supplied from in-vehicle batteries.

The other objects, features, aspects and effects of the invention will be more apparent from the following detailed description with reference to the drawing.

BRIEF DESCRIPTION OF DRAWING

FIG. 1 is a block diagram showing an overall configuration of a vehicle charge system according to a first embodiment of the invention.

DESCRIPTION OF EMBODIMENTS

First Embodiment

A vehicle charge system according a first embodiment of the invention will be described according to FIG. 1.

FIG. 1 is a block diagram showing an overall configuration of the vehicle charge system according to the first embodiment of the invention. Referring FIG. 1, a vehicle charge system 1 includes a connection cable 2, a driving battery charge apparatus 3, a driving battery 4, an auxiliary battery charge apparatus 5, an auxiliary battery 6, and a charge control portion 7.

The vehicle charge system 1 is installed to a vehicle (not shown), such as an automobile. The vehicle runs by driving a running motor (riot shown) using power of the driving battery 4. The auxiliary battery 6 supplies power to auxiliary machines (lamps, a wiper motor, a power window motor, an in-vehicle computer) provided to the vehicle.

A house 8 is provided with an outside power supply 9, such as a commercial power supply. The vehicle charge system 1 is connected to the outside power supply 9 via the connection cable 2.

The driving battery charge apparatus 3 has a first control circuit 10, a first power-supply circuit 11, and a first charge circuit 12. The first power-supply circuit 11 has means for supplying power from the auxiliary battery 6 to the first control circuit 10 together with the outside power supply 9.

The driving battery charge apparatus 3 charges the driving battery 4 with power supplied from the outside power supply 9 via the outside power-supply connection cable 2 using the first charge circuit 12. Between the driving battery charge apparatus 3 and the driving battery 4, a switch 13 is provided as opening and closing means capable of conveying and cutting a supply of power. The switch 13 is operated under the control of the first control circuit 10.

Also, the auxiliary battery charge apparatus 5 has a second control circuit 14, a second power-supply circuit 15, and a second charge circuit 16. The second power-supply circuit 15 has means for supplying power from the auxiliary battery 6 to the second control circuit 14 together with the outside power supply 9.

The auxiliary battery charge apparatus 5 charges the auxiliary battery 6 with power supplied from the driving battery 4 via a first internal power-supply connection cable 17 or from the driving battery charge apparatus 3 via a second internal power-supply connection cable 18 using the second charge circuit 16.

A charge processing flow of the vehicle charge system 1 using a vehicle charge method of this embodiment will now be described in detail using FIG. 1.

The second power-supply circuit 15 of the auxiliary battery charge apparatus 5 supplies power to the second control circuit 14, and the second control circuit 14 starts to operate. The second control circuit 14 first measures a voltage across the auxiliary battery 6. In a case where the measured voltage is equal to or higher than a predetermined value, the auxiliary battery 6 is charged with power from the driving battery 4 via the first internal power-supply connection cable 17 under the control of the charge control portion 7.

In a case where the measured voltage across the auxiliary battery 6 is below the predetermined value, that is, in a case where the second power-supply circuit 15 starts to operate with a supply of power from the outside power supply 9 while the auxiliary battery 6 runs out and the auxiliary machines are inoperable, the second control circuit 14 charges the auxiliary battery 6 with power from the driving battery charge apparatus 3 via the second internal power-supply connection cable 18 under its own control independently of the charge control portion 7. Likewise, the first power circuit 11 starts to operate with a supply of power from the outside power supply 9. Then, the driving battery charge apparatus 3 disconnects a charge path to the driving battery 4 using the switch 13 under its own control independently of the charge control portion 7 and supplies power to the auxiliary battery charge apparatus 5 with power from the outside power supply 9 via the second internal power-supply connection cable 18.

In this manner, according to this embodiment, even when power cannot be supplied from the auxiliary battery 6 nor from the driving battery 4, the auxiliary battery charge apparatus 5 can operate the second control circuit 14 with power supplied from the second power-supply circuit 15 using the outside power supply 9 on its own independently of an operation of the charge control portion 7. The auxiliary battery charge apparatus 5 thus becomes capable of charging the auxiliary battery 6 with power supplied from the driving battery charge apparatus 3 using the outside power supply 9.

This embodiment has described a case where the outside power supply 9 is a commercial power supply. It should be appreciated, however, that the outside power supply 9 may be a rapidly chargeable high-voltage DC power supply. Alternatively, the driving battery 4 may be a rapidly chargeable high-voltage DC power supply.

This embodiment has described an automobile as an example of the vehicle. It should be appreciated, however, that the invention is also applicable to any other vehicles, such as boats and ships, as long as the vehicle has a driving battery. Also, this embodiment has described an electric vehicle and a hybrid vehicle as an example of the vehicle. It should be appreciated, however, that the invention is applicable to any automobile as long as the automobile has a driving battery.

As has been described, according to the vehicle charge system and the vehicle charge method of the first embodiment, even when a supply of power to the first control circuit 10 of the driving battery charge apparatus 3 from a battery in the vehicle is stopped, the driving battery 4 and the auxiliary battery 6 can be charged with a supply of power from the outside power supply 9. Hence, a contribution can be made to a widespread use of environmentally-friendly electric vehicles or hybrid vehicles.

It should be understood that modifications and omissions can be made to the embodiment of invention within the scope of the invention as the need arises.

The invention claimed is:

1. A vehicle charge system, comprising:
a driving battery that feeds power to a running motor of a vehicle;
an auxiliary battery that feeds power to an auxiliary machine of the vehicle;
a charge control portion that controls charging of each of the driving battery and the auxiliary battery;
a driving battery charge apparatus that is controlled by the charge control portion and charges the driving battery ; and
an auxiliary battery charge apparatus that is controlled by the charge control portion and charges the auxiliary battery , the vehicle charge system being characterized in that:
the driving battery charge apparatus is formed of,
a first control circuit,
a first power-supply circuit that supplies power to the first control circuit, and
a first charge circuit that is capable of charging the driving battery, and
the first power-supply circuit is configured to supply power at least from an outside power supply to the first control circuit; and
the auxiliary battery charge apparatus is formed of,
a second control circuit,
a second power-supply circuit that supplies power to the second control circuit, and
a second charge circuit that is capable of charging the auxiliary battery, and
the second power-supply circuit is configured to supply power at least from the outside power supply to the second control circuit.

2. The vehicle charge system according to claim 1, characterized in that:
the second power-supply circuit supplies power from the outside power supply to the second control circuit when a voltage across the auxiliary battery is below a predetermined constant value, so that the auxiliary battery charge apparatus charges the auxiliary battery on its own without being controlled by the charge control portion.

3. The vehicle charge system according to claim 1, characterized in that:
the driving battery charge apparatus supplies power from the outside power supply to the first control circuit when a voltage across the auxiliary battery is below a predetermined constant value and cuts a connection between the driving battery charge apparatus and the driving battery while the auxiliary battery charge apparatus outputs predetermined power on its own without being controlled by the charge control portion.

4. The vehicle charge system according to claim 2, characterized in that:
the driving battery charge apparatus supplies power from the outside power supply to the first control circuit when a voltage across the auxiliary battery is below a predetermined constant value and cuts a connection between the driving battery charge apparatus and the driving battery while the auxiliary battery charge apparatus outputs predetermined power on its own without being controlled by the charge control portion.

5. A vehicle charge method in a vehicle charge system comprising:
a driving battery that feeds power to a running motor of a vehicle;
an auxiliary battery that feeds power to an auxiliary machine of the vehicle;
a charge control portion that controls charging of each of the driving battery and the auxiliary battery;
a driving battery charge apparatus that is controlled by the charge control portion and charges the driving battery; and
an auxiliary battery charge apparatus that is controlled by the charge control portion and charges the auxiliary battery,
the vehicle charge method being characterized in that:
when a voltage across the auxiliary battery is below a predetermined constant value, the driving battery charge apparatus and the driving battery are kept disconnected until the voltage across the auxiliary battery reaches or exceeds the predetermined constant value, so that the auxiliary battery alone is charged by the auxiliary battery charge apparatus that uses an output of the driving battery charge apparatus as a power supply source.

\* \* \* \* \*